Aug. 26, 1969  I. HASDAY  3,463,568
NON-SLIP EYEGLASS FRAMES
Filed Aug. 21, 1967
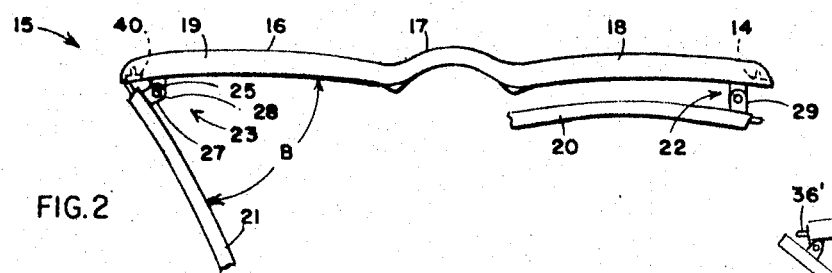
FIG. 2
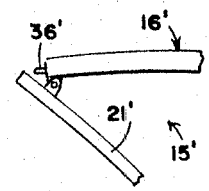
FIG. 6
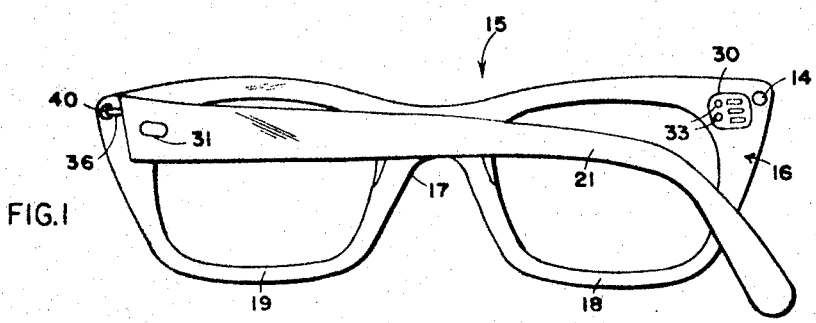
FIG. 1
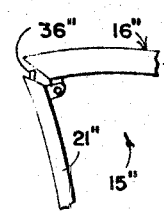
FIG. 7
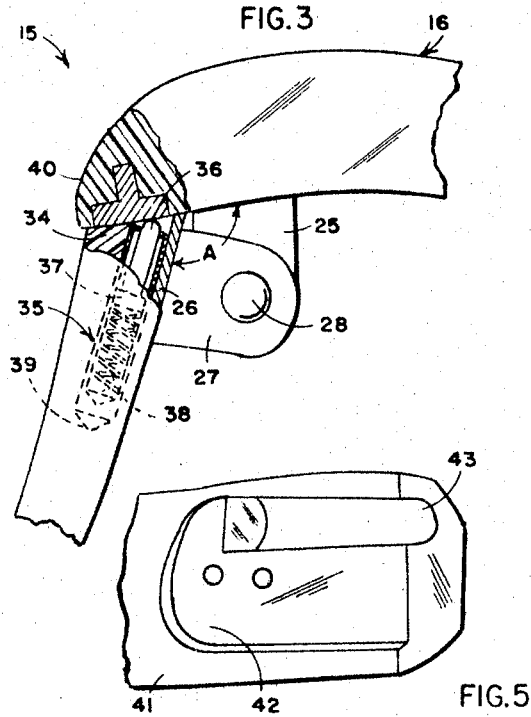
FIG. 3
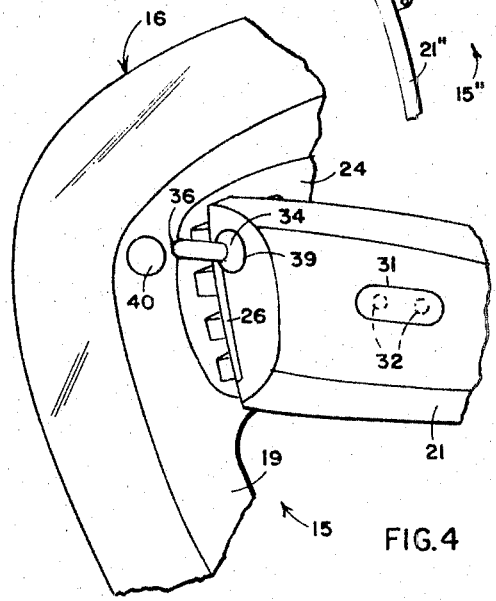
FIG. 4
FIG. 5
INVENTOR,
Irving Hasday,
BY
ATTORNEY.

3,463,568
NON-SLIP EYEGLASS FRAMES
Irving Hasday, New York, N.Y., assignor, by mesne assignments, to Modern Factors Corp., New York, N.Y., a corporation of New York
Filed Aug. 21, 1967, Ser. No. 662,041
Int. Cl. G02b 7/02
U.S. Cl. 350—113      2 Claims

ABSTRACT OF THE DISCLOSURE

The frames are of the type having hinged temples which extend rearwardly when in use, one behind each ear of the wearer. When the frame is being worn, its temples are biased to move towards each other whereby they clamp the head, and thus automatically hold the frame from slipping down on the nose. Such biasing is afforded by spring plunger devices whose casings are inserted, one into the front edge end of each temple, so the spring-biased pin of each device shall bear against the rear face of the front frame member. This general scheme is also shown in frames of modified construction. Said spring plungers are readily available in commerce and are easy and cheap to incorporate in the manner and for the purpose taught herein, namely, that a hinge part at each temple, when mounted, will clamp one of said casings in position in a channel in the temple.

---

The present invention relates to improvements in eyeglass frames, of the type having hinged temples, and particularly to constructions which keep them from slipping down the nose, so that they remain properly positioned to accomplish their optical function.

Many attempts have heretofore been made to hold the frame from slipping, but the means employed or suggested, were costly to produce, complicated in structure, objectionable in appearance, or presented other problems which made them commercially impractical or esthetically undesirable.

It is therefore the principal object of this invention to provide the non-slip feature in eyeglass frames of standard present day manufacture, by the simple, very inexpensive and readily commercially-available mechanical elements which I employ. The installation of such elements is simple and cheap, and avoids all the objectionable incidents heretofore existing.

A further object thereof is to provide a novel and improved non-slip eyeglass frame construction of the character and having the desirable attributes mentioned, which is efficient in carrying out the purposes for which it is designed.

Other objects and advantages will become apparent as this disclosure proceeds.

In the accompanying drawing forming part of this specification, similar characters of reference indicate corresponding parts in all the views.

FIG. 1 is a rear view of an eyeglass frame embodying teachings of this invention. One temple is omitted in order to expose various parts to which reference will be made. The other temple is shown swung to lie along the rear of the front frame member, and such temple includes a spring plunger biased outwardly.

FIG. 2 is a top plan view of FIG. 1 with the slight modification in illustration, that the left temple is shown in position where the plunger associated therewith makes first contact with a wear-resistant button element on the back surface of the front frame member. The right temple of the frame is shown swung to non-use position, along the rear of the front member of the frame. This view is fragmentary.

FIG. 3 is an enlarged fragmentary top plan view of the frame, shown partly in section. The temple is shown in its remotest swung-open position, where if let go, said temple will automatically be swung by action of its plunger, to assume the position as shown at the left in FIG. 2.

FIG. 4 is an enlarged fragmentary pictorial view showing the temple in partially "open" position; the plunger being soon ready to contact the wear-resistant button element provided therefor on the back face of the frame's front member.

FIG. 5 is a fragmentary enlarged pictorial view of the front end portion of a temple of modified construction.

FIGS. 6 and 7 are fragmentary top plan views of eyeglass frames of modified construction, each embodying this invention.

In the drawing, the numeral 15 designates generally an eyeglass frame having a front member 16, whose central nose bridge piece 17 connects a right lens mount 18 and a left lens mount 19, and hinged at the side end regions of said member are the temples 20 and 21, to extend rearwardly therefrom, one over each ear of the wearer when in use, but when not in use, said temples are swingable towards each other, to lie along the rear surface of said front member and across the lens mounts, to attain compact folded condition. The hinge structures are indicated generally by the numerals 22 and 23. One leaf 24 of the left hinge structure 23, is mounted on the front frame member 16, so that the hinge knuckles 25 thereof extend from the rear surface of said front frame member. The companion hinge leaf 26 is mounted on the left temple 21, so that the hinge knuckles 27 thereof extend from the inner face of said temple. The knuckles 25 and 27 are joined by the axis pin 28. The right hinge structure 22, whose axis pin is at 29, is similarly constructed and mounted, to associate the front frame member 16 and the temple 20. That hinge leaf of the hinge structure 22, which is mounted on the front frame piece 16, is shown at 30. The base of each hinge leaf of said hinge structures 22 and 23 is within a depression in the component it is attached to, and such attachment is made with a staple fitting of the type shown at 31, presenting twin pin rivets 32. Said rivets of the similar fitting securing the hinge leaf 30 are shown at 33.

The frame 15 to the extent specifically described as aforesaid is the preferred construction for the practice of this invention. Also suitable are the frames shown in FIGS. 6 and 7 in each of these frames 15' and 15", which are of the type as 15, comprising a front frame member and a pair of hinged temples, when a temple is moved to fully open position as illustrated in FIG. 3, it is stopped by the front frame member at an angle A which usually exceeds a right angle, and more than is necessary for the user to admit the head between the temples. In the frame 15, it is the front end edge of a temple that approaches and is stopped by the rear face of the front frame member 16. In the frame 15', it is the inside face of a temple that approaches and is stopped by an end edge of the front frame member 16'. In the frame 15", it is the front end edge of a temple that approaches and is stopped by an end edge of the front frame member 16". All of the above constructions, made of plastic, metal or other materials, are of well known frames which are adaptable to be equipped with means taught herein so that automatically said frames become head clamps and hence will be non-slipping.

In essence, I incorporate at each temple and front member juncture region, a spring plunger means, in such a manner that each temple will be automatically biased to approach an acute angle B, whenever the angle it makes with the frame member, exceeds B, thereby providing the mentioned head clamping action whereby the frame 15, 15′ or 15″ will not slide down the nose when in use, but will stay put where set. These plunger devices are indicated generally by the numeral 35.

These plungers per se, are well known in the mechanical arts as means to halt a movement, thereby serving as a detent, or to deter by slowing up a movement, thereby acting as a brake or drag maker. In my use herein of these devices, they act to shift a member to a prescribed position, or at least to bias said member toward said position when beyond such position. Each plunger device 35 is a unitary structure.

The plunger 35 comprises a miniature cylinder 34 having a slidable piston 37 therein, which is biased outwardly by a compression coil spring 38 held in the said cylinder or casing 34, but prevented from leaving the said cylinder, by the end of the cylinder through which extends the pin 36 which is said piston's rod.

In the frame 15, a plunger device 35 is force-fitted into a socket 39, opening in the front end edge of the temple 21, and being within and along said temple. The temple 20, is fitted with such a device 35 in like manner. In each instance the spring-biased pin 36 extends sufficiently so that when the temple it is associated with reaches the angle B position, said pin shall just contact the wear-resistant button 40 set flush into the rear of the front frame member 16, presuming the material of the frame to be plastic, which is the material preferred herein. Said protective button may be omitted when the frame is of metal.

The spring-biased pin 36′ is of the plunger device associated with the frame 15′, which device is mounted in the upper run of a lens mount, and thus its pin 36′ extends from an end of the front frame member 16′, and thus towards a temple as 21′, when the temple is swung from folded position. The spring-biased pin 36″ is of the plunger device associated with the frame 15″, which device is mounted in the upper run of a lens mount as for the frame 15′, or as shown, such device is mounted in the temple 21″. In all installations, a protective button insert should be provided at 40 and 14, for contact with the distal free end of the spring-urged pin 36, 36′ or 36″. The extent of such button is preferably sufficient that such contact shall continue from the condition where the angle is B and larger, in all frames made of plastic or other soft materials which might be cut into by the stressed pin in its wiping contact during temple movement.

Instead of having to drill a socket hole as 39 for housing a plunger device 35, the temple 41 for example, is of plastic, and so it is molded to provide a recessed seat 42 for the base of the leaf of the hinge structure which is to be carried by said temple 41, and there is a further depression, which is a channel-form as 43, to receive the cylinder which is the casing of a plunger device 35, so upon setting the parts together, the rivet pins 32 will cause the plunger casing to be securely clamped by the hinge leaf base which is against it as shown in FIG. 3. This materially lessens the cost of manufacture and assembly. The plunger cylinders or casings 34 as they are called, are preferably of round stock, but square or other shaped stock therefor, are equally adaptable and may be of advantage herein, when the depression 43 therefor is made of a channel section to suit, so there is no loosening of the cylinder 34, by turning therein.

The strength of the springs 38 shall be sufficient to accomplish the required head-clamping action.

Simple jigs suffice for the drilling of the sockets 34, and the mounting of the spring plunger devices 35 may be even done with ease on eyeglass frames already in use.

I claim:
1. In an eyeglass frame of the type comprising a front frame member having a central nose bridge piece connecting right and left lens mounts, two elongated temple members hingedly connected at the side ends of the front frame member respectively, and extending rearwardly therefrom to receive the head of a wearer between them; the axes of said hinge connections being between the temples when the temples extend rearwardly; said temples being swingable towards each other to lie along the rear surface and across the lens mounts of the front frame member when not in use; a part of the surface of each temple other than the inside face thereof, being opposite and substantially in proximity with a part of the surface of the front frame member other than the front face thereof, the improvement being means to bias the temple members t oswing towards each other when apart more than a prescribed angle, whereupon said temple members act as a clamp for the head of a wearer, to hold the frame when worn, from slipping down on the nose of the wearer; said means consisting of first and second spring plunger devices, each of which is a unitary structure comprising an elongated cylinder, a piston slidably mounted in said cylinder and held confined therein, a pin extending from said piston and externally out of the cylinder, in the manner of a piston rod, and a compression coil spring within the cylinder, biasing said piston outwardly of the cylinder; the external part of one of said pins being between said surface part of the right temple member and the opposite surface part of the front frame member; the distal end of said pin's external part, contacting one of said surface parts, and the cylinder thereof, being within the member presenting the other of said surface parts; the external part of the other of said pins being between said surface part of the left temple member and the opposite surface part of the front frame member; the distal end of said last-mentioned pin's external part, contacting one of said surface parts said last-mentioned pin is between, and the cylinder thereof being within the member presenting the other of said surface parts such last-mentioned pin is between; the greater part of each pin being within its cylinder, whereby when the temples are free to move, said pins will emerge from their respective cylinders and cause the temples to swing towards each other; each cylinder of the plunger devices being fitted in a channel depressed in the frame member it is in; said channel being closed along its length by a part which comprises a component of one of the hinge connections, said component constituting a means to clamp each cylinder in place and means securing said hinge part to said frame member.

2. An eyeglass frame as defined in claim 1, wherein those surface parts which are contacted by the distal free ends of said pins, are of wear-resistant material; the members presenting such wear-resistant parts, being of a material which would be worn by the continual rubbing of said pins against them as would be occasioned by the swinging movement of the temples.

References Cited

UNITED STATES PATENTS 2,098,921  11/1937  Mandaville _____ 351—113
3,156,756  11/1964  Seaver _____ 351—113

FOREIGN PATENTS 855,976  12/1960  Great Britain.

DAVID SCHONBERG, Primary Examiner

A. OSTRAGER, Assistant Examiner

U.S. Cl. X.R.

351—153